US007548329B2

(12) United States Patent
Sakai

(10) Patent No.: US 7,548,329 B2
(45) Date of Patent: Jun. 16, 2009

(54) IMAGE FORMATION APPARATUS, CONTROL METHOD OF IMAGE FORMATION APPARATUS, STORAGE MEDIUM OF STORING COMPUTER-READABLE PROGRAM, AND PROGRAM

(75) Inventor: Masahiko Sakai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 992 days.

(21) Appl. No.: 10/986,390

(22) Filed: Nov. 12, 2004

(65) Prior Publication Data

US 2005/0105122 A1 May 19, 2005

(30) Foreign Application Priority Data

Nov. 14, 2003 (JP) ............................ 2003-385060

(51) Int. Cl.
*G06F 15/00* (2006.01)
*G06K 1/00* (2006.01)

(52) U.S. Cl. .................... 358/1.14; 358/1.15; 358/1.16

(58) Field of Classification Search ................ 358/1.14, 358/1.15, 1.16, 444
See application file for complete search history.

(56) References Cited

U.S. PATENT DOCUMENTS

| | | | | |
|---|---|---|---|---|
| 6,208,432 | B1 * | 3/2001 | Kohtani et al. | 358/444 |
| 6,816,279 | B1 * | 11/2004 | Izumi et al. | 358/1.16 |
| 7,050,183 | B2 * | 5/2006 | Isshiki | 358/1.14 |
| 7,145,672 | B2 * | 12/2006 | Tomita et al. | 358/1.14 |
| 7,342,676 | B2 * | 3/2008 | Isshiki | 358/1.14 |
| 2001/0050783 | A1 * | 12/2001 | Sato et al. | 358/1.15 |

FOREIGN PATENT DOCUMENTS

| | | |
|---|---|---|
| JP | 9-223061 | 8/1997 |
| JP | 2000-99291 | 4/2000 |

* cited by examiner

*Primary Examiner*—Edward L. Coles
*Assistant Examiner*—Satwant K Singh
(74) *Attorney, Agent, or Firm*—Fitzpatrick, Cella, Harper & Scinto

(57) ABSTRACT

In an image formation apparatus which includes a nonvolatile memory, the apparatus has a first mode of controlling so that a job does not remain in the nonvolatile memory after image formation is performed based on the job and a second mode of storing the job in the nonvolatile memory and not physically deleting the job in the nonvolatile memory after the image formation is performed based on the job, it is registered whether the image formation is performed in the first mode or the second mode with respect to each user authenticated by the apparatus, and it is selectively controlled to perform the image formation in either one of the first mode and the second mode based on the user authentication.

16 Claims, 9 Drawing Sheets

MEMORY MAP OF STORAGE MEDIUM

IMAGE FORMATION APPARATUS, CONTROL METHOD OF IMAGE FORMATION APPARATUS, STORAGE MEDIUM OF STORING COMPUTER-READABLE PROGRAM, AND PROGRAM

BACKGROUND OF THE INVENTION

1. Field of the Invention

The present invention relates to an image formation apparatus which validates a job security function of the image formation apparatus in accordance with a user authenticated by the image formation apparatus, a processing method which is applicable to the image formation apparatus, a storage medium which stores a computer-readable program for executing the processing method, and the program itself.

2. Related Background Art

Conventionally, in an image formation apparatus which is equipped with a nonvolatile storage device such as a hard disk (HD) or the like, the storage device is used to temporarily store print data received from a host computer and temporarily store image data obtained by rasterizing the print data in order to simultaneously receive print requests and copy operation requests from plural users.

Consequently, in a case where the print data and/or the image data still remain in the storage device even after printing ended, if the remaining data flows out due to, e.g., theft of the apparatus, hacking or the like, a problem on security occurs. For this reason, there is provided a job security function which is to process and print the print data and/or the image data without temporarily storing them in the nonvolatile storage device, and is to completely delete (or erase) the print data and/or the image data temporarily stored in the nonvolatile storage device and still remain even after the printing ended, by overwriting the stored and remaining data with zero data or random data (Japanese Patent Application Laid-Open Nos. 2000-099291 and 9-223061).

However, in the above related background art, for example, in a case where a copy job or a print job is executed, if the job security function is entrusted to the operation of a specific individual (for example, the job security function is validated by a user operation), it is expected that setting is forgotten. This is undesirable on security.

Further, in a case where a print method which performs printing by using the job security function is the default setting of the image formation apparatus, when the job security function is achieved without temporarily storing print data and image data in the nonvolatile storage device, a problem that the image formation apparatus cannot simultaneously accept the print requests from a number of users.

Moreover, in the case where the job security function is achieved by completely deleting the print data and/or the image data temporarily stored in the nonvolatile storage device by overwriting them with the zero data or the random data after the printing ended, it is necessary to perform such data deletion in the nonvolatile storage device with respect to each job, whereby a total print time is remarkably prolonged. For this reason, a problem that print performance seriously degrades occurs.

SUMMARY OF THE INVENTION

An object of the present invention is to provide image formation apparatus and method which solve the above problems, a storage medium which stores a computer-readable program to achieve the image formation method, and the program itself.

Another object of the present invention is to provide an image formation apparatus which selectively controls whether or not to leave a job concerning image formation in a nonvolatile memory after the job ends, in accordance with an authenticated user.

Still another object of the present invention is to provide an image formation apparatus which has a first mode of sequentially storing a job concerning image formation in a nonvolatile memory and physically deleting the job stored in the nonvolatile memory after performing an image formation process to the job stored in the nonvolatile memory and a second mode of performing the image formation process without storing the job in the nonvolatile memory, and selectively controls whether to operate in the first mode or in the second mode according to an authenticated user.

Other objects and features of the present invention will be apparent from the following description in conjunction with the accompanying drawings.

DETAILED DESCRIPTION OF THE PREFERRED EMBODIMENTS

Hereinafter, the embodiments of the present invention will be explained with reference to the accompanying drawings.

In the following explanation, it should be noted that the subject that performs execution or judgment is a CPU as hardware and image formation control software as software as long as there is no specific designation.

Figure 1:
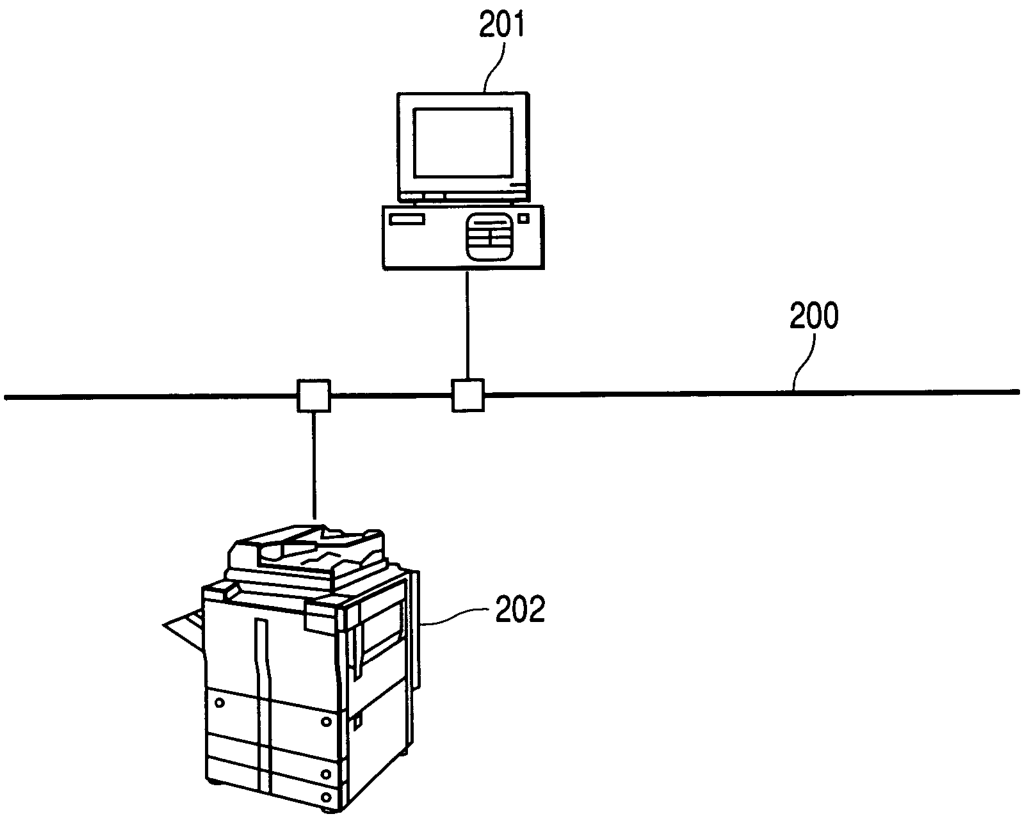
FIG. 1 is a diagram showing an example of an image processing system to which an image formation apparatus according to the embodiment of the present invention is applicable.

FIG. 1 is a diagram showing an example of an image processing system to which an image formation apparatus according to the embodiment of the present invention is applicable.

In FIG. 1, a host computer 201 transmits a print job, which is generated through, for example, an installed printer driver, to an image formation apparatus 202 under the control of a predetermined operating system. The image formation apparatus 202 rasterizes the print job received from the host computer 201 and then performs a print output.

Incidentally, plural computers (although they are not shown) are connected to a network 200, whereby each of the plural computers can transmit, as well as the host computer 201, the print job to the image formation apparatus 202 and can perform the print output.

It is structured that the image formation apparatus 202 can perform a copying operation, wherein an original is scanned by a scanner and image data obtained by the scanning operation is print output, to the original or can execute a facsimile reception or transmission process through a communication interface (not shown).

Subsequently, the detailed structure of the image formation apparatus 202 will be explained with reference to FIG. 2.

Figure 2:
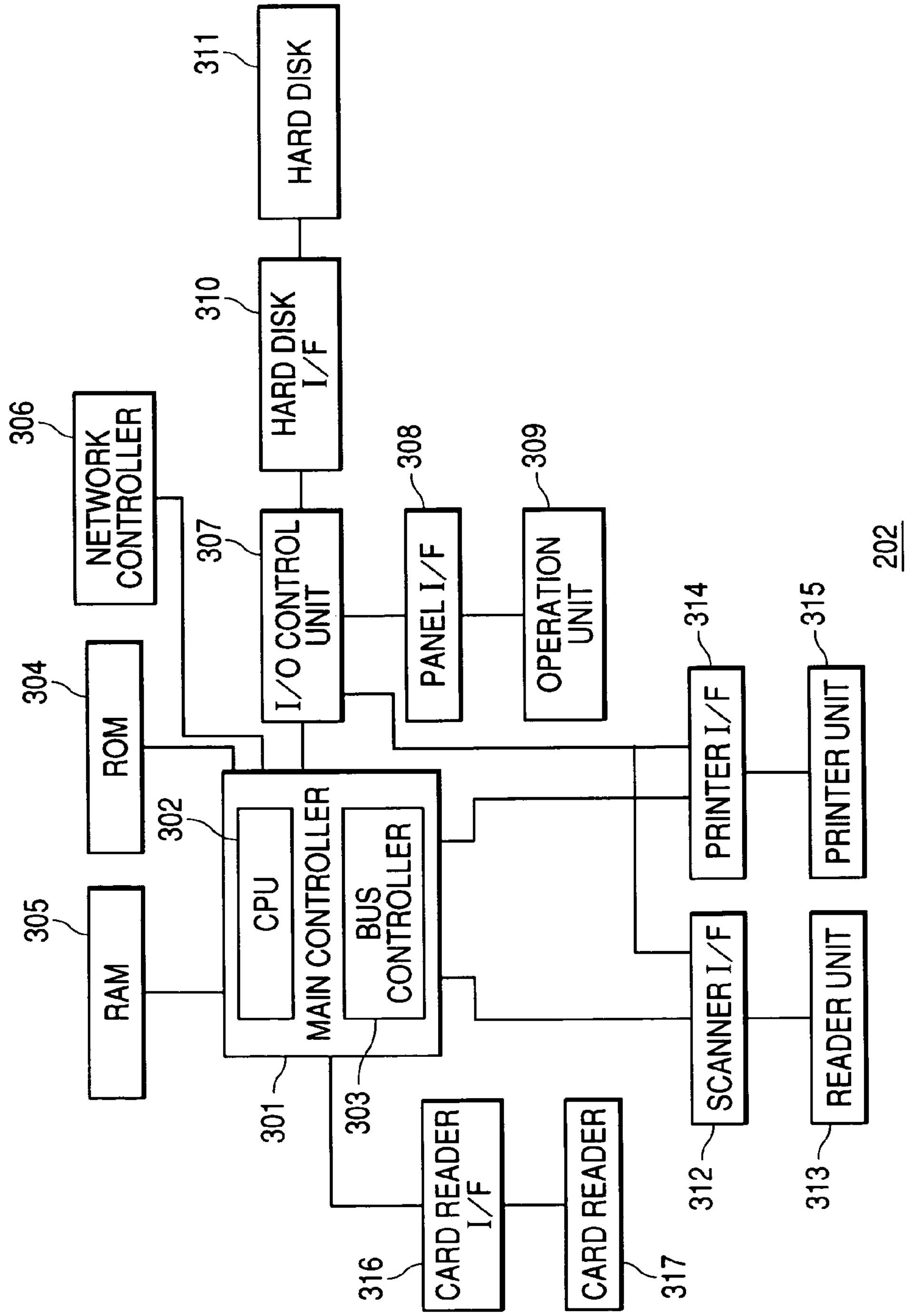
FIG. 2 is a block diagram showing the structure of the image formation apparatus shown in FIG. 1.

FIG. 2 is a block diagram showing the structure of the image formation apparatus 202 shown in FIG. 1.

In FIG. 2, the image formation apparatus 202 includes a main controller 301 which controls the entirety of this apparatus. The main controller 301 includes a CPU 302, a bus controller 303, various I/F (interface) controller circuits (not shown) and the like, and a ROM 304 and a RAM 305 are connected to the main controller 301.

The CPU 302 performs various processes according to programs read from the ROM 304. For example, the CPU 302 interprets a PDL (page-description language) received from the host computer 201 and executes an extraction process of extracting it into raster image data. The RAM 305 provides a working area for the CPU 302 and also stores image data. Besides, a network controller 306 which is connected to the main controller 301 has a network function such as Ethernet™ or the like. The network controller 306 is also connected to the network 200 (shown in FIG. 1).

Further, an I/O (input/output) control unit 307 is connected to the main controller 301.

Besides, the I/O control unit 307 is connected to a scanner I/F 312 and a printer I/F 314 so as to exchange control commands with the CPUs of a reader unit 313 and a printer unit 315 respectively.

In addition, the I/O control unit 307 which is connected to an operation unit 309 through a panel I/F 308 controls an LCD (liquid crystal display), LED's (light emitting diodes), switches and the like disposed on the operation unit 309. It is structured that an operator can input various settings and display errors through a screen displayed on the LCD disposed on the operation unit 309.

A hard disk I/F 310 is the interface for connecting an external storage device. Image data can be written into and read from the external storage device by connecting the external storage device such as a hard disk 311 or the like to the hard disk I/F 310.

The main controller 301 is connected to the reader unit 313 through the scanner I/F 312. Here, the scanner I/F 312 has a process function to optimally perform a binarization process, a magnification change process and the like to image data received from the reader unit 313, and a function to generate a control signal based on a video control signal received from the reader unit 313 and output the generated control signal to the main controller 301.

Likewise, the main controller 301 is connected to the printer unit 315 through the printer I/F 314. Here, the printer I/F 314 has a function to perform a smoothing process to image data output from the main controller 301 and output the processed data to the printer unit 315, and a function to generate a control signal based on a video control signal received from the printer unit 315 and output the generated control signal to the main controller 301.

Besides, it is controlled by the bus controller 303 to transfer the raster image data extracted on the RAM 305 to the printer unit 315, and the extracted raster image data is transferred to the printer unit 315. A card reader I/F 316 is the interface of a card reader 317 acting as a reading device of an IC card.

Figure 3:
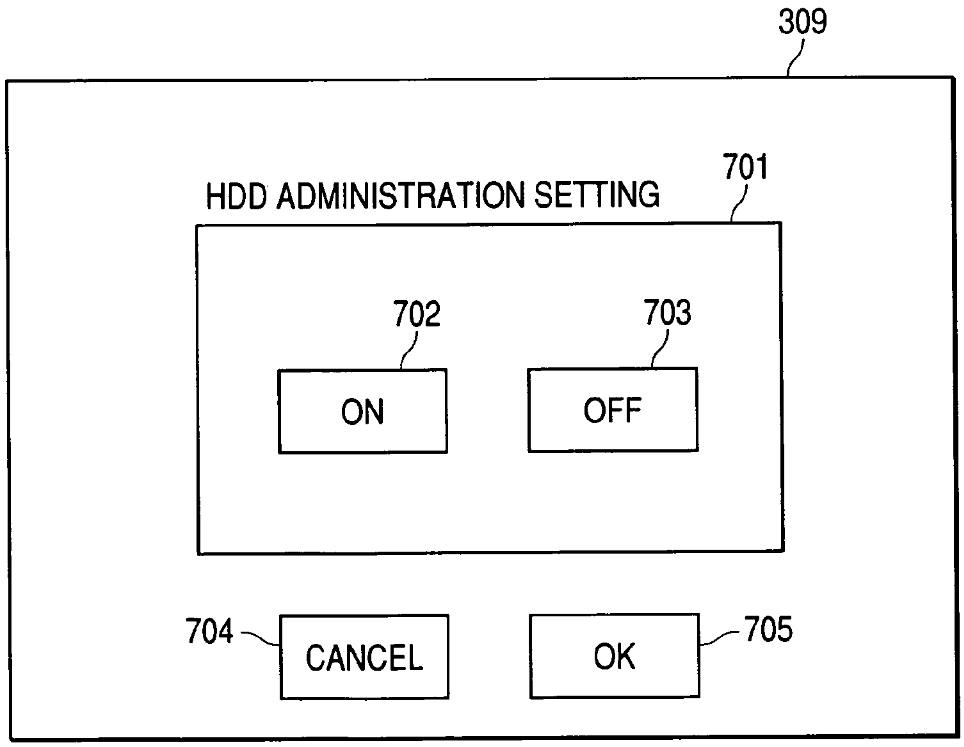
FIG. 3 is a view showing an example of an operation screen to be displayed on the operation unit shown in FIG. 2.

FIG. 3 is a view showing an example of an operation screen to be displayed on an operation unit 309 shown in FIG. 2, and corresponds to an example of an HDD administration setting screen used for performing a job security setting in the present embodiment.

A job security setting screen shown in FIG. 3 is constituted by an HDD administration setting area 701 used for setting validity/invalidity of a job security function, a button 704 used for canceling the setting in the HDD administration setting area 701 and a button 705 used for fixing the setting in the HDD administration setting area 701.

The HDD administration setting area 701 is constituted by a button 702 used for validating the job security function and a button 703 used for invalidating the job security function.

On this screen, a user depresses the button 702 used for validating the job security function and ten depresses the button 705 to fix the current input.

The setting of the job security function fixed by the above operation is stored in the hard disk 311 of the image formation apparatus. Further, a user permitted to use the apparatus is registered in the hard disk of the image formation apparatus, and the setting of the job security function is stored in the hard disk 311 corresponding to the user registered in the image formation apparatus.

Hereinafter, an operating procedure of the image formation apparatus in case of switching the job security setting every user discriminated by a discrimination means in the present embodiment will be explained.

Figure 4:
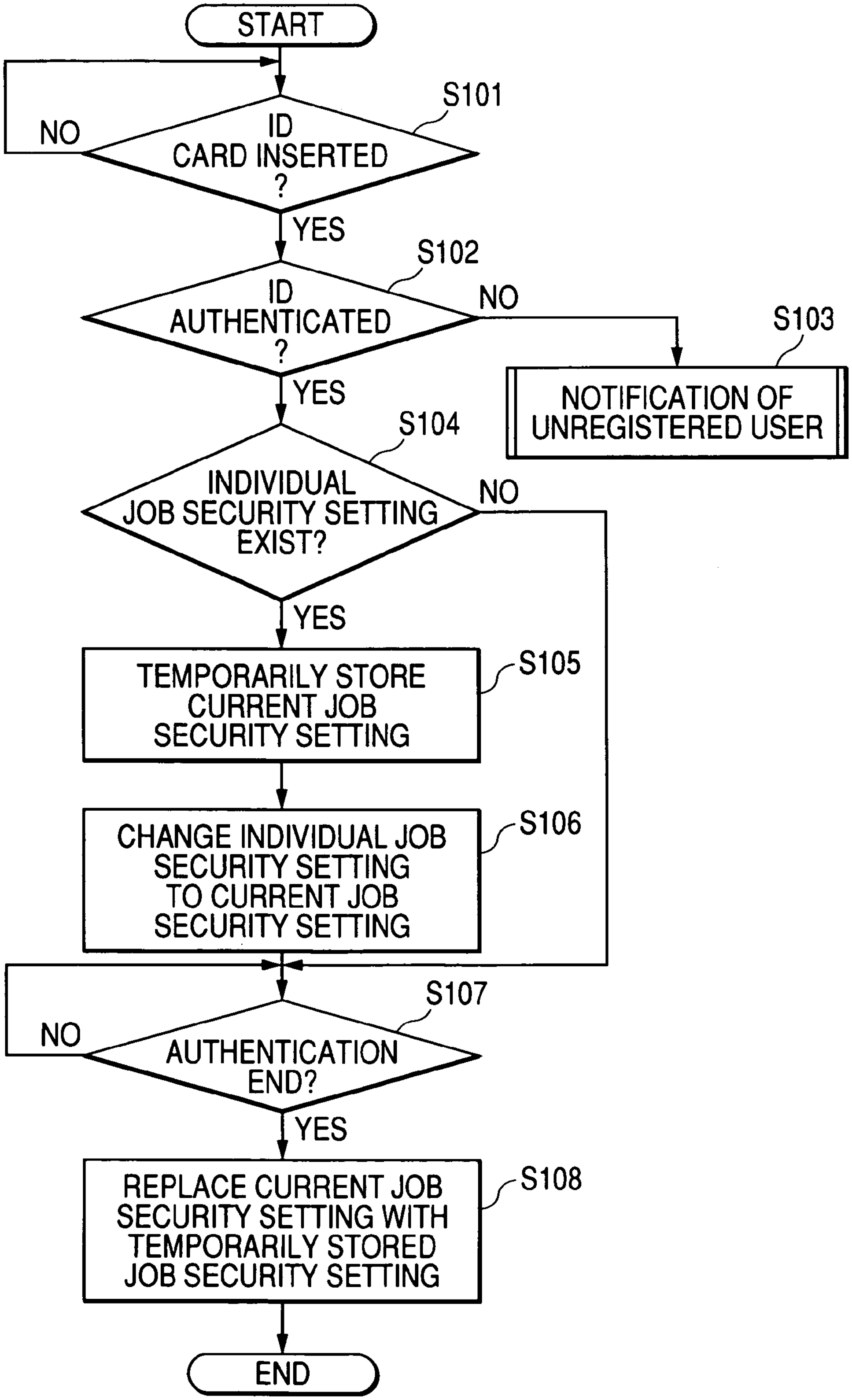
FIG. 4 is a flow chart showing an example of a first data processing procedure to be executed in the image formation apparatus according to the embodiment of the present invention.

FIG. 4 is a flow chart showing an example of a first data processing procedure to be executed in the image formation apparatus according to the embodiment of the present invention, and this data processing procedure corresponds to a job security processing procedure executed by loading control programs stored in the hard disk 311 or the ROM 304 into the RAM 305 by the CPU 302 shown in FIG. 2. It should be noted that reference symbols S101 to S108 denote respective steps. In the present embodiment, as a use of an ID card, a card reader and a magnetic card are used for performing authentication. However, as the ID card, another authenticating medium such as a contact IC card or a non-contact IC card may be used. As a means for performing authentication, which may be performed on the basis of a user ID and a password input by the user on the operation unit 309 of the image formation apparatus without using the ID card, or a bionic authentication utilizing a finger mark or an iris may be used.

The code corresponding to the card ID is stored in an individual magnetic card portable by the user, and when the unregistered code is detected by the card reader, it is failed to authenticate the user. In a state that the magnetic card is not inserted into the card reader, a common default setting is used for the job security setting.

A personal ID or a group ID can be judged from the inserted card.

Initially, in the step S101, when it is detected that the magnetic card is inserted into the card reader (it is detachably structured in the operation unit 309 shown in FIG. 2) by the user in the image formation apparatus, it is judged whether or not ID information stored in the inserted magnetic card is a proper ID registered in an ID data table stored in the hard disk 311 in the step S102. When it is judged that the authentication is resulted in failure, an error screen is to be displayed on the operation unit 309 (not shown) so as to notify the failure in the authentication to the user in the step S103.

Then, in the step S104, it is judged whether or not an individual job security setting for the sake of the user authenticated in the step S102 exists on the hard disk 311. When it is judged that the setting does not exist, a flow advances to the step S107.

It should be noted that the individual job security setting for the sake of the authenticated user is, for example, previously set by an administrator by an operation performed on the operation screen shown in FIG. 3 and is stored in, for example, the hard disk 311 of the image formation apparatus.

On the other hand, in the step S104, when it is judged that the setting exists, the current job security setting is temporarily stored in the RAM 305 (that is, the current job security setting is saved and stored). Then, in the step S106, the individual job security setting is changed to the current job security setting.

Then, in the step S107, it is judged whether or not a valid period of the authentication (a case that the valid period differs in a user and a group according to ID of the magnetic card is included) is expired, or it is judged whether or not a user who performs the authentication terminates to use the image formation apparatus and performs an operation of definitely terminating an authenticated status. When it is judged that the authentication is not terminated, the judgment to be executed in the step S107 is repeated, and when it is judged that the authentication is terminated, the flow advances to the step S108, where the contents of the current job security setting is replaced with the contents of the job security setting temporarily stored in the RAM 305 and then the present process is terminated.

Hereinafter, an operating procedure of the image formation apparatus in case of switching the individual job security setting every user discriminated by the discrimination means in the present embodiment will be explained.

Figure 5:
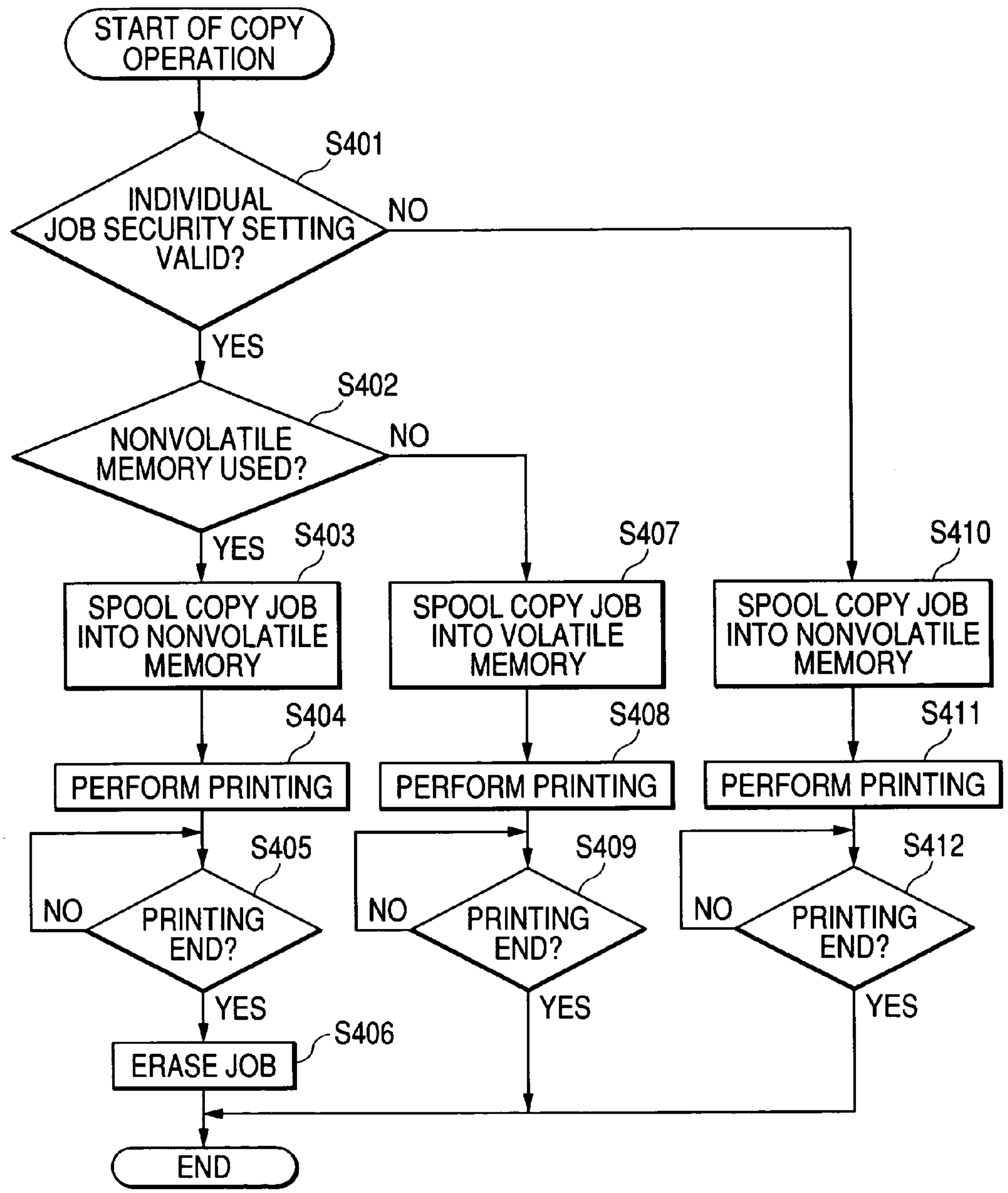
FIG. 5 is a flow chart showing an example of a second data processing procedure to be executed in the image formation apparatus according to the embodiment of the present invention.

FIG. 5 is a flow chart showing an example of a second data processing procedure to be executed in the image formation apparatus according to the embodiment of the present invention, and this data processing procedure corresponds to a copy processing procedure executed by loading control programs stored in the hard disk 311 or the ROM 304 into the RAM 305 by the CPU 302 shown in FIG. 2. It should be noted that reference symbols S401 to S412 denote respective steps.

Initially, in the step S401, it is judged whether or not the individual job security setting is valid in the image formation apparatus. When it is judged that the individual job security setting is valid, a flow advances to the step S402, where it is judged whether or not a nonvolatile memory (for example, the hard disk 311) is used for a copy job process. When it is judged that the nonvolatile memory is used, the flow advances to the step S403, where a requested copy job is spooled into the nonvolatile memory such as the hard disk 311.

With respect to the judgment whether or not the nonvolatile memory is used for the copy job process, it may be set when the job security function, which is set on the operation screen shown in FIG. 3, is set every user registered in the image formation apparatus by operating the operation unit 309.

Then, in the step S404, the copy job spooled into the nonvolatile memory in the step S403 is read out with a predetermined timing and then a print process is started, and it is judged whether or not the print process is terminated in the step S405. When it is judged that the print process is not terminated, the print process is continued, and when it is judged that the print process is terminated, job data on the nonvolatile memory is erased by, for example, an overwriting process of "0" data or an overwriting process of random data in the step S406 and then the present process is terminated.

On the other hand, in the step S402, when it is judged that the nonvolatile memory is not used, the requested copy job is spooled into a volatile memory such as the RAM 305 (step S407).

Then, in the step S408, the copy job spooled into the RAM 305 in the step S407 is read out with a predetermined timing and then the print process is started, and it is judged whether or not the print process is terminated in the step S409. When it is judged that the print process is not terminated, the print process is continued, and when it is judged that the print process is terminated, the present process is terminated.

On the other hand, in the step S401, when it is judged that the job security setting is not valid, the requested copy job is spooled into the nonvolatile memory such as the hard disk 311 in the step 410.

Then, in the step S411, the copy job spooled into the nonvolatile memory in the step S410 is read out with a predetermined timing and then the print process is started, and it is judged whether or not the print process is terminated in the step S412. When it is judged that the print process is not terminated, the print process is continued, and when it is judged that the print process is terminated, the present process is terminated.

Figure 6:
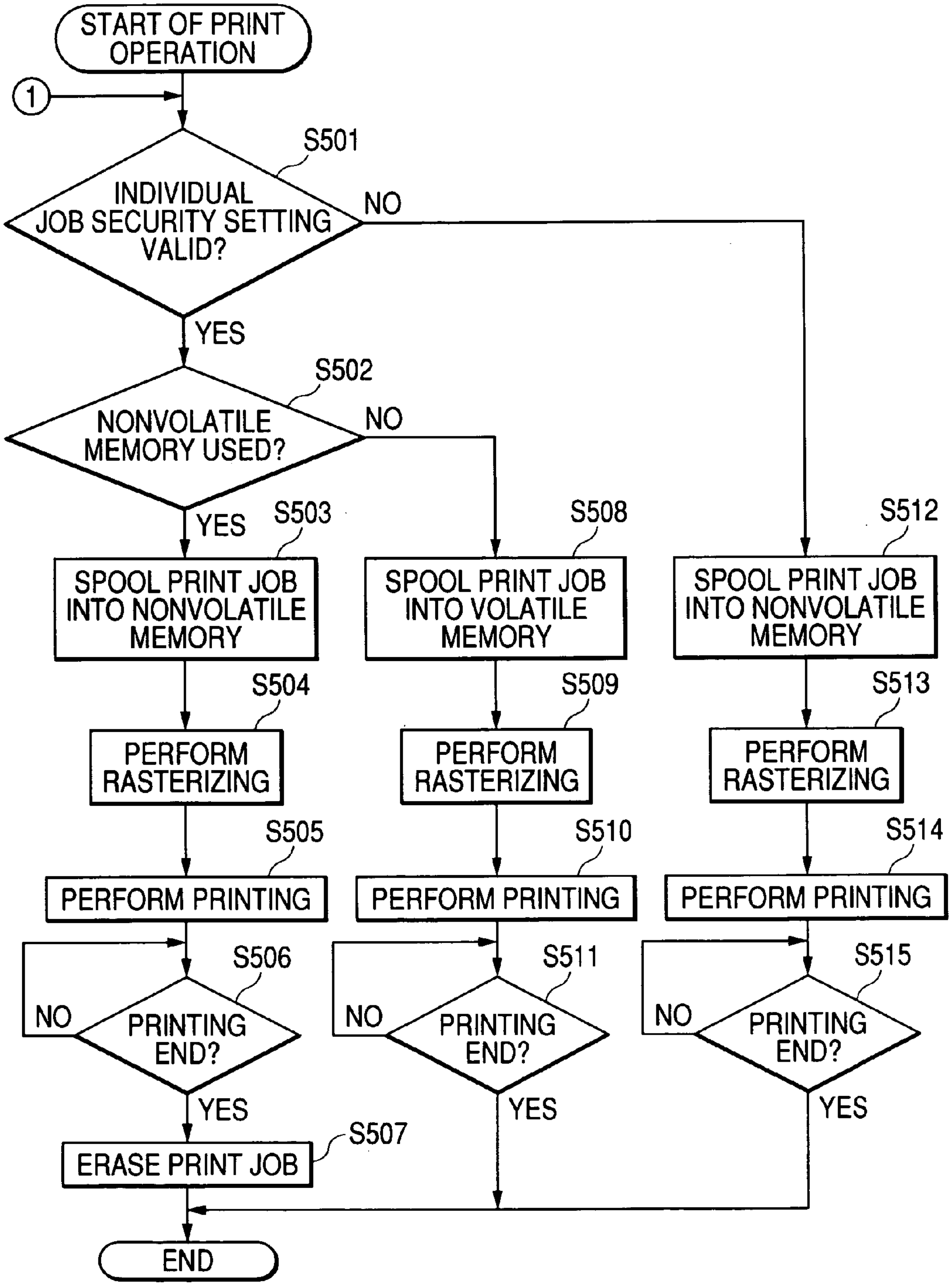
FIG. 6 is a flow chart showing an example of a third data processing procedure to be executed in the image formation apparatus according to the embodiment of the present invention.

FIG. 6 is a flow chart showing an example of a third data processing procedure to be executed in the image formation apparatus according to the embodiment of the present invention, and this data processing procedure corresponds to a print processing procedure executed by loading control programs stored in the hard disk 311 or the ROM 304 into the RAM 305 by the CPU 302 shown in FIG. 2. It should be noted that reference symbols S501 to S515 denote respective steps.

Initially, in the step S501, it is judged whether or not the individual job security setting is valid in the image formation apparatus. When it is judged that the individual job security setting is valid, a flow advances to the step S502, where it is judged whether or not the nonvolatile memory (for example, the hard disk 311) is used for a print job process requested from the host computer 201. When it is judged that the nonvolatile memory is used, the print job requested from the host computer 201 is spooled into the nonvolatile memory such as the hard disk 311 in the step S503.

With respect to the judgment whether or not the nonvolatile memory is used for the print job process, it may be set when the job security function, which is set on the operation screen shown in FIG. 3, is set every user registered in the image formation apparatus by operating the operation unit 309.

Then, in the step S504, a rasterizing process is executed to the print job spooled into the nonvolatile memory in the step S503 on the RAM 305. In the present rasterizing process, a band unit or a page unit of image data is dynamically switched and controlled by the CPU 302.

Subsequently, in the step S505, image data rasterized in the step S504 is transferred to the printer unit 315, and the print process is started. Then, in the step S506, it is judged whether or not the print process is terminated. When it is judged that the print process is not terminated, the print process is continued, and when it is judged that the print process is terminated, job data on the nonvolatile memory is erased by, for example, the overwriting process of "0" data or the overwriting process of random data in the step S507 and then the present process is terminated.

On the other hand, in the step S502, when it is judged that the nonvolatile memory is not used, the requested print job is spooled into the volatile memory such as the RAM 305 in the step S508.

Then, in the step S509, the print job spooled into the RAM 305 in the step S508 is read out with a predetermined timing and then the rasterizing process is executed, and the rasterized image data is transferred to the printer unit 315 and then the print process is started in the step S510. In the step S511, it is judged whether or not the print process is terminated. When it is judged that the print process is not terminated, the print process is continued, and when it is judged that the print process is terminated, the present process is terminated.

On the other hand, in the step S501, when it is judged that the individual job security setting is not valid, the flow advances to the step S512, where the requested print job is spooled into the nonvolatile memory.

Then, in the step S513, the print job spooled into the RAM 305 in the step S512 is read out with a predetermined timing and then the rasterizing process is executed, and the rasterized image data is transferred to the printer unit 315 and then the print process is started in the step S514. In the step S515, it is judged whether or not the print process is terminated. When it is judged that the print process is not terminated, the print process is continued, and when it is judged that the print process is terminated, the present process is terminated.

Figure 7:
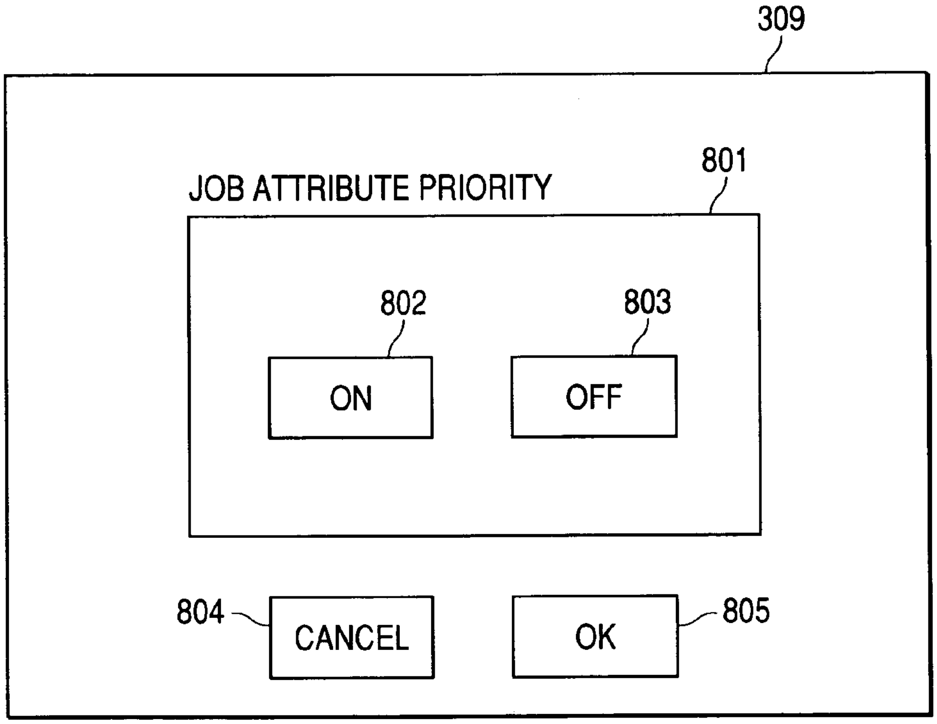
FIG. 7 is a view showing an example of an operation screen to be displayed on the operation unit shown in FIG. 2.

FIG. 7 is a view showing an example of an operation screen to be displayed on the operation unit 309 shown in FIG. 2, and this screen corresponds to an example of a job attribute priority setting screen.

In the job attribute priority setting screen shown in FIG. 7, this screen is constituted by a job attribute priority setting area 801 used for setting whether or not a job security setting of the job attribute included in print job data is made to give priority as against the job security setting set in the image formation apparatus in a case that the job security setting has been performed for the job attribute included in the print job data transmitted from the host computer 201, a button 804 used for canceling the setting in the job attribute priority setting area 801 and a button 805 used for fixing the setting in the job attribute priority setting area 801.

Further, the job attribute priority setting area 801 is constituted by a button 802 used for validating a job attribute priority function and a button 803 used for invalidating the job attribute priority function.

On this screen, the user depresses the button 802 used for validating the job attribute priority function and then the user can fix the current input by depressing the button 805. Then, the job attribute priority setting fixed by operating the button 805 is stored in the hard disk 311 of the image formation apparatus.

Figure 8:
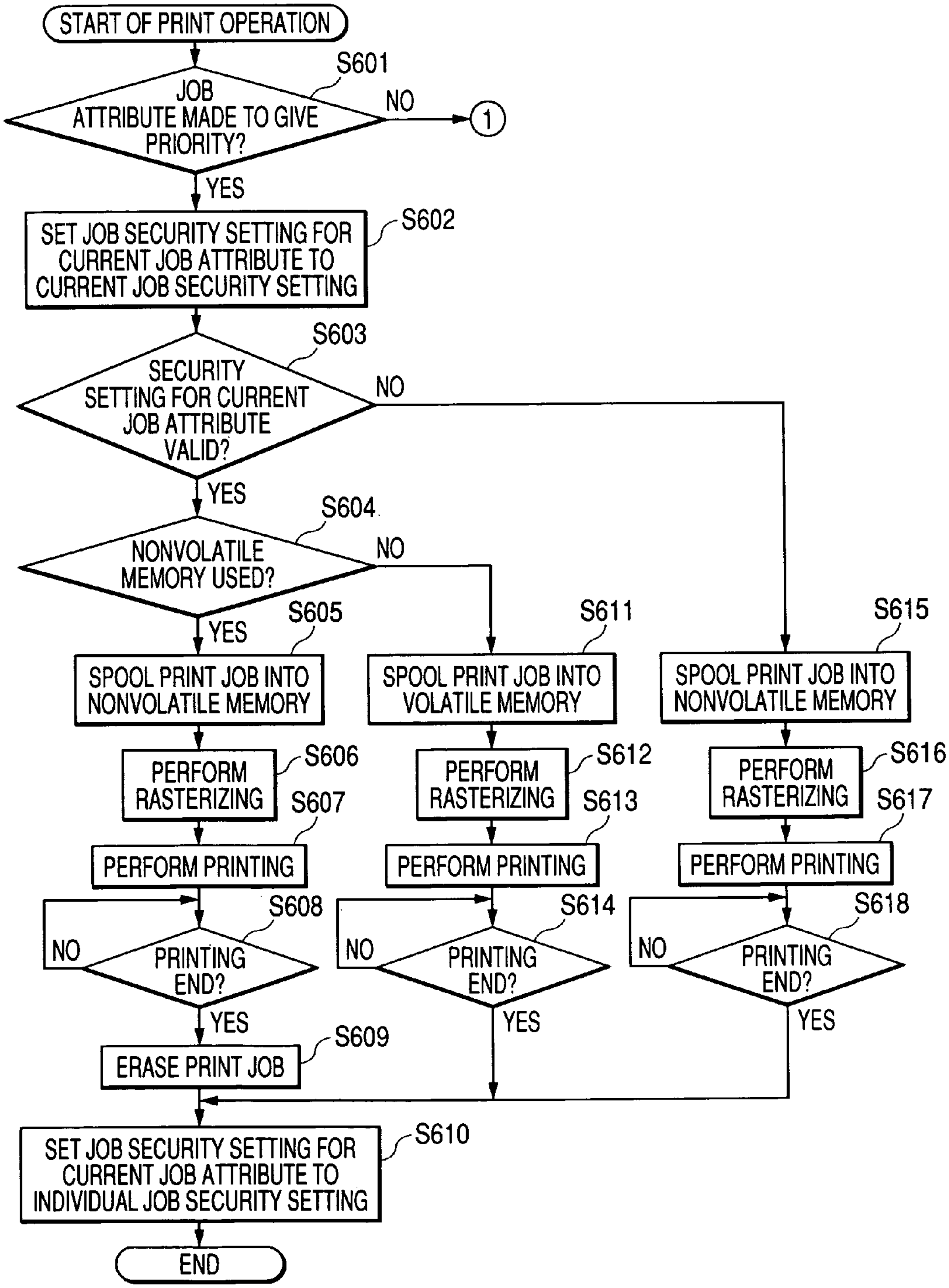
FIG. 8 is a flow chart showing an example of a fourth data processing procedure to be executed in the image formation apparatus according to the embodiment of the present invention.

FIG. 8 is a flow chart showing an example of a fourth data processing procedure to be executed in the image formation apparatus according to the embodiment of the present invention, and this data processing procedure is the print processing procedure executed by loading control programs stored in the hard disk 311 or the ROM 304 into the RAM 305 by the CPU 302 shown in FIG. 2 and corresponds to a print processing procedure in a case that the job security setting has been performed for the job attribute included in the print job data transmitted from the host computer 201. It should be noted that reference symbols S601 to S618 denote respective steps.

Initially, in the step S601, it is judged whether or not the job security setting of the job attribute included in the print job data is made to give priority as against the job security setting set in the image formation apparatus.

An individual job attribute priority setting for the sake of the authenticated user is previously set by the administrator and is stored in the hard disk 311 of the image formation apparatus.

Then, in the step S601, when it is judged that the priority is not given to the job security setting of the job attribute, the process is shifted to the print process which is started from the step S105 shown in FIG. 6.

On the other hand, in the step S601, when it is judged that the priority is given to the job security setting of the job attribute, the job security setting set for the current job attribute is regarded as the current job security setting in the step S602.

Subsequently, in the step S603, it is judged whether or not the security setting for the current print job attribute is valid in the image formation apparatus, and when it is judged that the security setting for the current print job is valid, it is judged whether or not the nonvolatile memory is used for the present print job process in the step S604.

With respect to the security setting for the print job attribute, it can be set by, for example, a printer driver or the like in the host computer 201 which generates the print job.

Then, in the step S604, when it is judged that the nonvolatile memory is used, the print job received from the host computer 201 is spooled into the nonvolatile memory such as the hard disk 311 in the step 605. Next, in the step S606, the print job spooled into the nonvolatile memory in the step S605 is read out on the RAM 305 and then the rasterizing process is started.

Subsequently, in the step S607, image data rasterized in the step S606 is transferred to the printer unit 315 and then the print process is started.

Then, in the step S608, it is judged whether or not the print process is terminated, and when it is judged that the print process is terminated, job data in the nonvolatile memory is erased by the overwriting process of "0" data or the overwriting process of random data in the step S609. Then, in the step S610, the job security setting set for the current job attribute is regarded as the individual job security setting and then the present process is terminated.

On the other hand, in the step S604, when it is judged that the nonvolatile memory is not used, the print job received from the host computer 201 is spooled into the volatile memory such as the RAM 305 in the step S611. Then, in the step S612, the print job spooled into the volatile memory in the step S611 is analyzed and then the rasterizing process is executed on the RAM 305.

Then, in the step S613, image data rasterized on the RAM 305 in the step S612 is transferred to the printer unit 315 and then the print process is started. Next, in the step S614, it is judged whether or not the print process is terminated. When it is judged that the print process is not terminated, the print process is to be on standby, and when it is judged that the print process is terminated, the present process is terminated.

On the other hand, in the step S603, when it is judged that the job security setting is not valid, the print job received from the host computer 201 is spooled into the nonvolatile memory such as the hard disk 311 in the step S615. Next, in the step S616, the print job spooled into the nonvolatile memory in the step 615 is read out on the RAM 305 and then the rasterizing process is started.

Subsequently, in the step S617, image data rasterized in the step S616 is transferred to the printer unit 315 and then the print process is started. Next, in the step S618, it is judged whether or not the print process is terminated. When it is judged that the print process is not terminated, the print process is to be on standby, and when it is judged that the print process is terminated, the present process is terminated.

In FIG. 8, an operation in case of giving the priority to the security setting of the print job has been explained by enumerating an example of the print job. However, in the copy job, the same effective operation can be realized. In a case of the copy job, the security setting for the copy job intended to be executed can be set in a valid or an invalid status by operating the operation unit 309 of the image formation apparatus by the user. And, in a case of the copy job, when the priority is not given to the job attribute (in case of "NO" in the step S601) in the step S601, a flow has only to shift to the just before the step S401 shown in FIG. 5.

According to the above embodiment, in the image formation apparatus, the security can be improved in a manner that the job of an authenticated user is to be printed with the job security function of every user previously registered.

Further, since a user capable of executing the print process without using a hard disk is limited, the improvement in the printing performance for the entire device can be expected.

Still further, in a case that the user intentionally instructs designation different form the job security setting based on the authenticated result by the job attribute, it is possible to execute the print process by giving priority to the job attribute. Therefore, an effect of improving convenience can be obtained.

Hereinafter, the constitution of data processing programs which can be read by the image formation apparatus according to the present invention will be explained with reference to a memory map shown in FIG. 9.

Figure 9:
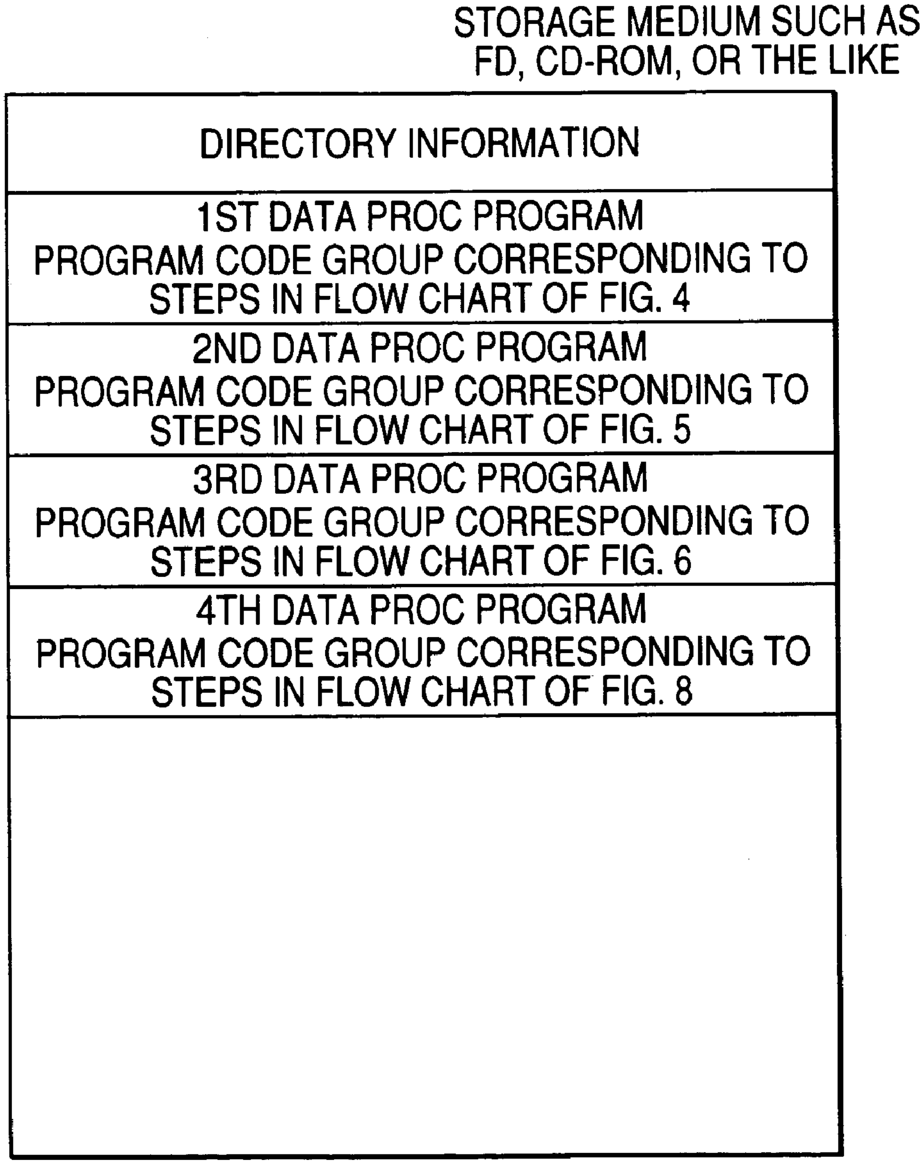
FIG. 9 is a view for explaining a memory map of a storage medium for storing various data processing programs which can be read by the image formation apparatus according to the embodiment of the present invention.

FIG. 9 is a view for explaining a memory map of a storage medium for storing various data processing programs which can be read by the image formation apparatus according to the embodiment of the present invention.

Although it is not especially illustrated, information of managing program groups to be stored in a storage medium such as, for example, version information, information related to a creator and the like are also stored, and information depending on an OS (operating system) or the like at a side of reading out the programs such as, for example, icons and the like for discriminatingly displaying the programs are also sometimes stored.

Further, data subordinate to various programs is also managed by the above directory. Still further, a program used for installing various program into a computer, an extracting program used in a case that the program to be installed is compressed, and the like are also sometimes stored.

Functions shown in FIGS. 4 to 6 and FIG. 8 in the present embodiment may be performed by a host computer according to programs to be installed from an external. In this case, the present invention is applicable also in a case that information groups including programs are supplied to the image formation apparatus by the storage medium such as a CD-ROM, a flash memory, an FD or the like, or from an external storage medium through a network.

As mentioned above, it is needless to say that an object of the present invention can be achieved in a case where a storage medium recording the program codes of software for realizing the functions of the above embodiments is supplied to a system or an apparatus and then a computer (or CPU or MPU) in the system or the apparatus reads and executes the program codes stored in the storage medium.

In this case, the program codes themselves read from the storage medium realize the new functions of the present invention, and the storage medium storing such the program codes constitutes the present invention.

Therefore, if the functions of the programs are included, a form of the program such as an object code, a program executed by an interpreter, script data to be supplied to an OS, or the like is not cared.

The storage medium for supplying the programs can be, for example, a flexible disk, a hard disk, an optical disk, a magnetooptical disk, an MO, a CD-ROM, a CD-R, a CD-RW, a magnetic tape, a nonvolatile memory card, a ROM, a DVD or the like.

In this case, the program codes themselves read from the storage medium realize the functions of the above embodiments, and the storage medium storing such the program codes constitutes the present invention.

As another method of supplying the program, which can be also supplied by downloading the computer program itself of the present invention or a file which is compressed and includes automatic installing function into the storage medium such as the hard disk or the like from a homepage by connecting to the homepage on an internet by using browser of a client computer. Further, the supplying of the program can be also realized by dividing program codes constituting the program of the present invention into a plurality of files and downloading the respective files from the different homepage. That is, a WWW server, a ftp (file transfer protocol) server or the like, which makes the plural users to download program files for realizing the functional process of the present invention by the computer, is also included in appended claims of the present invention.

The program of the present invention which is encoded and stored in the storage media such as the CD-ROMs or the like are distributed to users, and key-information for solving the encoded program is made to be downloaded for the specific user who clears a predetermined condition from the homepage through the internet, and that user executes the encoded program by using the key-information to install the program into the computer. Thereby, the supplying of the program can be also realized.

It is needless to say that the present invention also includes not only a case where the functions of the above embodiments are realized by the execution of the program codes read by the computer, but also a case where an OS (operating system) or the like functioning on the computer executes all the process or a part thereof according to the instructions of the program codes, thereby realizing the functions of the above embodiments.

Further, it is needless to say that the present invention includes a case where the program codes read from the storage medium are once written in a memory provided in a function expansion board inserted in the computer or a function expansion unit connected to the computer, then a CPU or the like provided in the function expansion board or the function expansion unit executes all the process or a part thereof according to the instructions of such the program codes, thereby realizing the functions of the above embodiments.

When the image formation control software is installed into the host computer 201, an install program is initially loaded into a system of the host computer 201 and then the loaded install program is executed by the CPU 302. Next, the install program to be executed by the CPU 302 reads out the image formation control software from the storage medium which stores the image formation control software, and that read out software is to be stored in the hard disk 311.

The present invention is not limited to the above embodiments, but may be modified in various manners on the basis of the spirit of the present invention, and the various modifications are not excluded from the scope of the present invention.

Although various samples and embodiments have been indicated and explained, the spirit and scope of the present invention are not limited to the specific explanation described in the specification for the skilled person.

The present invention is not limited to the above embodiments, but of course can be variously modified within the scope of not deviating from the spirit of the present invention.

In the above embodiments, a magnetic card is used as an authenticating means. However, it is not limited to the magnetic card, but a card to be inserted into a card reader may be another recorded medium such as an IC card, a card mounting a non-contact recorded medium, or the like. Even if an image formation apparatus is such the apparatus which does not have a card reader device, the authentication may be performed in a manner that a user manually inputs an ID and a password on an operation panel of the image formation apparatus and then the authentication is performed by the input ID and the password instead of performing the authentication by using the card reader.

The present invention is applicable to a system composed of plural equipments (for example, a host computer, an interface equipment, a reader, a printer and the like) or to an apparatus including single equipment (for example, an image formation apparatus, a facsimile apparatus or the like).

This application claims priority from Japanese Patent Application No. 2003-385060 filed on Nov. 14, 2003, which is hereby incorporated by reference herein.

What is claimed is:

1. An image formation apparatus, comprising:

an input unit adapted to input authentication information for specifying a user;

an authentication unit adapted to authenticate whether or not the specified user is a proper user whose use request of said image formation apparatus is approved, based on the authentication information input by said input unit;

a register adapted to register a security setting with respect to each user authenticated by said authentication unit;

a judgment unit adapted to judge whether or not the security setting corresponding to the user authenticated by said authentication unit has been registered by said register; and a controller adapted to control to process the job in one of a first mode of storing a job concerning image formation in a nonvolatile memory and deleting the job stored in the nonvolatile memory after performing an image formation process to the job stored in the nonvolatile memory, or a second mode of performing the image formation process without storing the job in the nonvolatile memory, in a case where said judgment unit judges that the security setting corresponding to the user authenticated by said authentication unit is registered.

2. An image formation apparatus according to claim 1, wherein said image formation apparatus further has a third mode of sequentially storing the job in the nonvolatile memory and not physically deleting the job stored in the nonvolatile memory after performing the image formation process to the stored job, and said controller controls, when it is judged by said judgment unit that the security setting corresponding to the user authenticated by said authentication unit is not registered by said register, to process the job in said third mode.

3. An image formation apparatus according to claim 1, wherein the job concerning the image formation has a job attribute including a job control information, said image formation apparatus further comprises a setting unit adapted to set whether or not to give priority to the job attribute of the job concerning the image formation, and said controller validates the job control information included in the job attribute and invalidates the security setting registered by said register when it is set by said setting unit to give priority to the job attribute of the job concerning the image formation, and invalidates the job control information included in the job attribute and validates the security setting registered by said register when it is set by said setting unit not to give priority to the job attribute of the job concerning the image formation.

4. An image formation apparatus according to claim 1, wherein the job concerning the image formation includes a print job and a copy job.

5. An image formation apparatus according to claim 1, further comprising:

a volatile memory adapted to be able to store the job concerning the image formation, wherein, in said second mode, the job is not stored in the nonvolatile memory but is stored in the volatile memory.

6. An image formation apparatus, comprising:

input means for inputting authentication information for specifying a user;

authentication means for authenticating whether or not the specified user is a proper user whose use request of said image formation apparatus is approved, based on the authentication information input by said input means;

register means for registering a security setting with respect to each user authenticated by said authentication means;

judgment means for judging whether or not the security setting corresponding to the user authenticated by said authentication means has been registered by said register means; and a controller adapted to controlling to process the job in one of a first mode of storing a job concerning image formation in a nonvolatile memory and deleting the job stored in the nonvolatile memory after performing an image formation process to the job stored in the nonvolatile memory, or a second mode of performing the image formation process without storing the job in the nonvolatile memory, in a case where said judgment means judges that the security setting corresponding to the user authenticated by said authentication means is registered.

7. An image formation apparatus which has a nonvolatile memory for storing a job concerning image formation, comprising:

an input unit adapted to input authentication information for specifying a user;

an authentication unit adapted to authenticate whether or not the specified user is a proper user whose use request of said image formation apparatus is approved, based on the authentication information input by said input unit;

a register adapted to register a security setting with respect to each user authenticated by said authentication unit;

a judgment unit adapted to judge whether or not the security setting corresponding to the user authenticated by said authentication unit has been registered by said register; and a controller adapted to control, in case a where said judgment unit judges that the security setting corresponding to the user authenticated by said authentication unit has been registered, to process the job concerning the image formation so that the job is not stored in the nonvolatile memory, after executing the image formation.

8. An image formation apparatus according to claim 7, further comprising a volatile memory adapted to store the job concerning the image formation, wherein, in a case where said judgment unit judges that the security setting corresponding to the user authenticated by said authentication unit has been registered, said controller controls so that the job is not stored in the nonvolatile memory after execution of the job ends, by not storing the job in the nonvolatile memory but storing the job in the volatile memory.

9. An image formation apparatus according to claim 7, wherein, in a case where said judgment unit judges that the security setting corresponding to the user authenticated by said authentication unit has been registered, said controller stores the job in the nonvolatile memory and deletes the job remaining in the nonvolatile memory according to the end of the job execution.

10. A control method for an image formation apparatus which has a first mode of sequentially storing a job concerning image formation in a nonvolatile memory and physically deleting the job stored in the nonvolatile memory after performing an image formation process to the job stored in the nonvolatile memory and a second mode of performing the image formation process without storing the job in the nonvolatile memory, said method comprising the steps of:

inputting authentication information for specifying a user;

authenticating whether or not the specified user is a proper user whose use request of the image formation apparatus is approved, based on the input authentication information;

judging whether or not a security setting corresponding to the authenticated proper user is registered to a register; and controlling to process the job in one of a first mode of storing a job concerning image formation in a nonvolatile memory and deleting the job stored in the nonvolatile memory after performing an image formation process to the job stored in the nonvolatile memory and a second mode of performing the image formation process without storing the job in the nonvolatile memory, in a case where a result of the judgment is that the security setting corresponding to the user authenticated is registered.

11. A control method according to claim 10, wherein the image formation apparatus further has a third mode of sequentially storing the job in the nonvolatile memory and not physically deleting the job stored in the nonvolatile memory after performing the image formation process to the stored job, and said control step controls, when it is judged in said judgment step that the security setting corresponding to the user authenticated is not registered, to process the job in said third mode.

12. A control method according to claim 10, wherein the job concerning the image formation has a job attribute including a job control information, said control method further comprises a step of setting whether or not to give priority to the job attribute of the job concerning the image formation, and said control step validates the second job control information included in the job attribute and invalidates the security setting when it is set in said setting step to give priority to the job attribute of the job concerning the image formation, and invalidates the job control information included in the job attribute and validates the security setting when it is set in said setting step not to give priority to the job attribute of the job concerning the image formation.

13. A control method according to claim 10, wherein the job concerning the image formation includes a print job and a copy job.

14. A control method for an image formation apparatus which has a nonvolatile memory and a volatile memory both for storing jobs concerning image formation, comprising the steps of:

inputting authentication information for specifying a user;

authenticating whether or not the specified user is a proper user whose use request of the image formation apparatus is approved, based on the input authentication information;

judging whether or not a security setting corresponding to the authenticated proper user is registered to register; and controlling, in a case where it is judged in said judgment step that the security setting corresponding to the authenticated user has been registered, to process the job concerning the image formation so that the job is not stored in the nonvolatile memory, after executing the image formation.

15. A computer-readable storage medium storing a computer-executable program causing a computer to execute a control method for an image formation apparatus which has a first mode of sequentially storing a job concerning image formation in a nonvolatile memory and physically deleting the job stored in the nonvolatile memory after performing an image formation process to the job stored in the nonvolatile memory and a second mode of performing the image formation process without storing the job in the nonvolatile memory, said method comprising the steps of:

inputting authentication information for specifying a user;

authenticating whether or not the specified user is a proper user whose use request of the image formation apparatus is approved, based on the input authentication information;

judging whether or not a security setting corresponding to the authenticated proper user is registered to a register; and controlling to process the job in one of a first mode of storing a job concerning image formation in a nonvolatile memory and deleting the job stored in the nonvolatile memory after performing an image formation process to the job stored in the nonvolatile memory and a second mode of performing the image formation process without storing the job in the nonvolatile memory, in a case where a result of the judgment is that the security setting corresponding to the user authenticated is registered.

16. A computer-readable storage medium storing a computer-executable program for causing a computer to execute a control method for an image formation apparatus which has a nonvolatile memory and a volatile memory both for storing jobs concerning image formation, comprising the steps of:

inputting authentication information for specifying a user;

authenticating whether or not the specified user is a proper user whose use request of the image formation apparatus is approved, based on the input authentication information;

judging whether or not a security setting corresponding to the authenticated proper user is registered to register; and controlling, in a case where it is judged in said judgment step that the security setting corresponding to the authenticated user has been registered, to process the job concerning the image formation so that the job is not stored in the nonvolatile memory, after executing the image formation.

* * * * *